United States Patent [19]
Ziolo

[11] Patent Number: 5,667,924
[45] Date of Patent: Sep. 16, 1997

[54] SUPERPARAMAGNETIC IMAGE CHARACTER RECOGNITION COMPOSITIONS AND PROCESSES OF MAKING AND USING

[75] Inventor: Ronald F. Ziolo, Webster, N.Y.

[73] Assignee: Xerox Corporation, Stamford, Conn.

[21] Appl. No.: 600,642

[22] Filed: Feb. 14, 1996

[51] Int. Cl.$^6$ .................................................. G03G 13/06
[52] U.S. Cl. ........................... 430/39; 430/122; 427/467
[58] Field of Search ..................... 430/39, 122; 427/466, 427/469

[56] References Cited

U.S. PATENT DOCUMENTS

| | | | |
|---|---|---|---|
| 4,854,550 | 8/1989 | Gruber et al. | 430/39 |
| 5,124,217 | 6/1992 | Gruber et al. | 430/39 |
| 5,140,368 | 8/1992 | Szlucha | 382/7 |
| 5,219,554 | 6/1993 | Groman et al. | 424/9 |
| 5,567,564 | 10/1996 | Ziolo | 430/115 |

*Primary Examiner*—Roland Martin
*Attorney, Agent, or Firm*—John L. Haack

[57] ABSTRACT

An image character recognition process comprising: forming an image in a predetermined size and predetermined shape on a receiver member with a marking composition containing a superparamagnetic component; detecting the predetermined size and predetermined shape of the formed image by placing the resulting image bearing receiver member in a magnetic sensing field comprising at least one magnetic sensor and forming a magnetic size and magnetic shape profile map of the detected image; and recognizing the detected image by comparing the magnetic size and magnetic shape profile map of the formed image with reference magnetic profile image maps.

23 Claims, 1 Drawing Sheet

SUPERPARAMAGNETIC IMAGE CHARACTER RECOGNITION COMPOSITIONS AND PROCESSES OF MAKING AND USING

CROSS REFERENCE TO COPENDING APPLICATIONS AND RELATED PATENTS

Reference is made to commonly assigned copending applications: U.S. Ser. No. 08/178,540 (90063 I) filed Jan. 7, 1994, now U.S. Pat. No. 5,567,564, entitled "Magnetic and Nonmagnetic Particles and Fluid, Methods of Making and Methods of Using the Same", which discloses low optical density magnetic fluids for use in liquid development compositions and wherein a submicron particle size ion exchange resin may be selected to avoid further micronization or particle size reduction processing steps; U.S. Ser. No. 08/290,125 (D/93433) filed Jul. 15, 1994, pending entitled "Magnetic Nanocomposite Compositions and Processes for the Preparation and Use Thereof", which discloses a magnetic nanocomposite composition comprising from about 0.001 to about 60 weight percent of nanocrystalline particles of $Fe_3O_4$, and from about 40 to about 99.999 weight percent of a resin; U.S. Ser. No. 08/332,174 (D/94178) filed Nov. 31, 1994, pending entitled "Magnetized Pigments and Method and Apparatus for Producing Magnetized Pigments", which discloses a method and apparatus for producing magnetized pigments by forming a pigment coating on an external surface of a magnetic material core; the magnetized pigment can be produced by forming a vaporized core of a magnetic material and forming the pigment coating on the magnetic material core; U.S. Ser. No. 08/500,215 (D/94863) filed Jul. 10, 1995, pending entitled "Magnetic Refrigerant Compositions and Processes for Making and Using"; U.S. Ser. No. 08/332,174 (D/94178) discloses a method for producing a magnetized pigment comprising the steps of: forming a magnetic material core in a vaporized state from a vaporized magnetic material; and forming a pigment coating on the magnetic material core while in the vaporized state; U.S. Ser. No. 08/584,585 (D/95365) filed Jan. 11, 1996, pending entitled "Magnetic Nanocompass Compositions and Processes for Making and Using" wherein there is disclosed a magnetic composition comprising nanocomposite particles comprising from about 0.001 to about 60 weight percent of magnetic nanocrystalline particles dispersed in from about 40 to about 99.999 weight percent of a discrete phase matrix, and a continuous phase matrix, wherein the discrete phase resides in interstices within the continuous phase matrix; and also disclosed therein are nanomagnetic compositions and processes for making and using the compositions in, for example, nanocompass and navigational articles and devices, alternating current transformers, and related applications.

Attention is directed to commonly owned and assigned U.S. Pat. Nos.: 4,474,866, issued Oct. 2, 1984, entitled "Developer Compositions Containing Superparamagnetic Polymers" which discloses a developer composition containing superparamagnetic polymers; 5,322,756 (D/91331), issued Jun. 21, 1994, entitled "Expedient Method for the Preparation of Magnetic Fluids and other Stable Colloidal Systems"; 5,362,417 (D/90063), issued Nov. 8, 1994, entitled "Method of Preparing a Stable Colloid of Submicron Particles", which discloses submicron particles which are dispersible to form an aqueous colloid. Also disclosed is a method of forming the stable dispersion which includes providing an ion exchange resin, loading the ion exchange resin with an ion, and treating the loaded resin to form nanoscale particles. The resin and nanoparticles can be fluidizing to form an aqueous stable colloid. Also of interest are U.S. Pat. No. 5,358,659 (D/91332), issued Oct. 25, 1994, entitled "Magnetic Materials with Single-Domain and Multidomain Crystallites and a Method of Preparation"; and U.S. Pat. No. 4,457,523, issued Oct. 10, 1995, entitled "Ferrofluid Media Charging of Photoreceptors".

The disclosures of each of the aforementioned documents including all the copending applications are totally incorporated herein by reference.

BACKGROUND OF THE INVENTION

The present invention relates to superparamagnetic image character recognition compositions and processes of making and using, and more particularly concerns image character recognition processes and printing processes and printed articles thereof.

In the process of electrophotographic printing, a photoconductive member is uniformly charged and exposed to a light image of an original document. Exposure of the photoconductive member records an electrostatic latent image corresponding to the informational areas contained within the original document. After the electrostatic latent image is recorded on the photoconductive surface, the latent image is developed by bringing a developer material into contact therewith. This forms a powder image on the photoconductive member which is subsequently transferred to a receiver sheet and permanently affixed thereto in image configuration.

Electrophotographic printing has been particularly useful in the commercial banking industry by reproducing checks or financial documents with magnetic ink, that is by fusing magnetic toner particles thereon. Each financial document has characters or symbols imprinted thereon which are recognized as unique characters of a specified type font. The document, upon which the characters are printed, is advanced past a magnetizing station, or alternatively as referred to in the art, a "write" station, where the magnetizable ink is subjected to a magnetic field which magnetizes the ink in accordance with the unique geometry of the imprinted characters. The magnetic characters each have their own unique magnetic field which may be read by a magnetic ink character recognition (MICR) reader and processed.

The magnetic characters are susceptible to surface wear during magnetic writing and reading operations wherein the magnetic characters retain substantially all their visible printed image qualities but the "magnetic signature" or magnetic image properties of the characters can be substantially distorted, diminished, or altered. Additionally, the characters are highly susceptible to the aforementioned magnetic signature changes as a result of accidental or deliberate exposure of the magnetic characters to electromagnetic fields of a strength which is comparable to that the magnetic fields used to initially magnetize or magnetically "write" the printed characters in a MICR process. Thus, MICR processes and MICR printed products, as well as other articles which employ magnetically encoded characters, writings, or the like information, are susceptible to alteration by the influence of external magnetic fields or electromagnetic radiation.

The following United States patents are noted as being of interest to the background of the present invention.

U.S. Pat. No. 4,859,550 Patentee: Gruber et al. Issued: Aug. 22, 1989

U.S. Pat. No. 5,124,217 Patentee: Gruber et al. Issued: June 23, 1992

U.S. Pat. No. 5,140,368 Patentee: Szlucha Issued: Aug. 18, 1992

U.S. Pat. No. 5,219,554 Patentee: Groman et al. Issued: Jun. 15, 1993

Some relevant portions of the foregoing patents may be briefly summarized as follows:

U.S. Pat. No. 4,859,550, discloses an electrophotographic process which comprises the generation of latent image; developing the image with a toner composition comprised of resin particles, magnetite particles, and an additive component comprised of an aliphatic hydrocarbon or a polymeric alcohol of the formula $CH_3(CH_2)_nCH_2OH$ wherein n is a number of form about 30 to about 500; and subsequently providing the developed image with magnetic ink characters thereon to a reader/sorter device whereby toner offsetting and image smearing is minimized in said device.

U.S. Pat. No. 5,124,217, discloses an electrophotographic process for enabling substantially tamperproof images, including the generation of a latent image; developing the image with a toner composition comprised of resin particles, magnetite particles, and a colored organic soluble dye, a colored organic insoluble dye, or the salts thereof; and an optional additive component comprised of an aliphatic hydrocarbon or a polymeric alcohol of the formula $CH_3(CH_2)_nCH_2OH$ is wherein n is a number of form about 30 to about 500.

U.S. Pat. No. 5,140,368, a character printing and detection system in which a toner image is fixed to a sheet with each character of the toner image being inverted so that the normally leading edge of each character is the trailing edge. The toner image on the sheet is magnetized. The sheet of support material is reinverted so that the leading edge of each character of the toner image fixed to the sheet of the support material is the trailing edge. The intensity of the magnetic field generated by each character of the toner image fixed to the sheet is detected to identify each character.

U.S. Pat. No. 5,219,554, discloses hydrated biodegradable superparamagnetic metal oxides for use in biological imaging applications.

The disclosures of each of the aforementioned documents are totally incorporated herein by reference.

U.S. Pat. No. 5,358,659 (D/91332) assigned to the assignee of the present application, and which is incorporated herein by reference in its entirety, discloses a method of forming magnetic materials having tunable magnetic properties and the magnetic materials formed thereby. The magnetic materials contain both single-domain and multi-domain particles and have high initial permeability while maintaining coercivity and remanence in the material. A method for making a magnetic ferrofluid comprises providing a colloidal suspension of submicron ion exchange resin matrix, loading the resin matrix by ultrafiltration with a magnetic ion, precipitating single-domain particles within said resin and precipitating multidomain particles outside of the resin to form a stable colloidal dispersion of the resin and particles.

In the aforementioned commonly assigned U.S. Pat. No. 5,362,417 (D/90063) there is disclosed a method of forming a colloidal dispersion of submicron particles comprising: providing an ion exchange resin matrix; loading said resin matrix with an ion; and treating the resin to cause in-situ formation of submicron particles; and fluidizing said ion exchange resin and particles in an aqueous medium to form a stable colloid of the particles.

In commonly owned U.S. Pat. No. 5,321,770 there is disclosed a method for determining the boundaries of a symbol or word string within an image, including the steps of determining page orientation, isolating symbol strings from adjacent symbol strings, establishing a set of boundaries or references with respect to which measurements about, or further processing of, the symbol string may be made. Many of the references cited therein, including U.S. Pat. documents and other publications, provide exemplary methods for detecting, recognizing, and distinguishing characters and images by, for example, comparative means.

U.S. Pat. No. 4,474,866, assigned to the assignee of the present application, discloses a developer composition containing superparamagnetic polymers. The developer composition disclosed in this patent consists of a dispersion of fine particles of iron oxide in a polystyrene ion exchange resin. More specifically, the developer composition consists of $\gamma\text{-}Fe_2O_3$ (gamma) disposed in a sulfonated divinylbenzene cross-linked polystyrene resin.

The disclosures of each of the aforementioned commonly assigned documents are totally incorporated herein by reference.

The present invention also relates to processes for preparing magnetic marking compositions having substantially only rotationally free, single domain magnetic particles. More particularly, the present invention relates to magnetic marking compositions possessing novel magnetic properties including: being free of barriers to a change in system magnetization (M); having substantially no magnetic memory or hysteresis; having high initial magnetic permeability; the magnetic response of the composition becomes infinite up to about the saturation magnetization of the composition upon application of a magnetic field (H); temperature and magnetic field dependent magnetic properties; solid-liquid phase dependent reversible superparamagnetic to paramagnetic properties; low magnetic resistivity; electrically insulating; and exceptionally high resistance to quantum tunneling above about 0° K.

The present invention also relates to methods for forming and manipulating the magnetic properties of isolated nano-compass particles, for example, the size or dimensions of the single domain may be controlled to a great extent by the strength and duration of an externally applied pulsed electromagnetic field that is used to "carve" or etch individual domains, interstices or cavities within a continuous solid or gel phase during the preparation of the superparamagnetic marking compositions.

The term "domain" as used herein is described, for example, in C. P. Bean and J. D. Livingston, *J. Appl. Physics*, 30, 120 (1959); and B. D. Cullity, *Introduction to Magnetic Materials*, Addison-Wesley Publishing Co., Mass., (1972), which are incorporated by reference in their entirety, and refers in the case of single domain particles of the present invention to, for example, discrete magnetically isolated and non interacting superparamagnetic nanoparticles. Although not wanting to be limited by theory, it is believed that the presence of substantially or exclusively single-domain crystallites in the compositions of the present invention enable the aforementioned combination of novel magnetic properties and applications thereof.

Properties of magnetic fluids are disclosed, for example, in *Magnetic Fluids Guidebook: Properties and Applications*, V. E. Fertman, Hemisphere Publishing Corp., N.Y., 1990, the disclosure of which is incorporated herein by reference in its entirety. The magnetic properties of magnetic fluids as a function of temperature have been extensively studied. For example, for conventional ferromagnetic or ferrimagnetic single-domain particles, spontaneous magnetization disappears at a certain temperature known as the Curie point($T_c$).

also known as the magnetic transition temperature. At the Curie point, the exchange atom interaction energy is equal to the thermal interaction energy, and the substance becomes paramagnetic. The upper Curie point is the temperature above which ferroelectric materials lose their polarization and the lower Curie point is the temperature below which some ferroelectric materials lose their polarization. When ferromagnetic materials become paramagnetic at the Curie point the material exhibits the so-called Curie-Weiss effect or behavior.

There exists a need for image character recognition systems, imaging processes, compositions, articles, and devices, that are suitable for use in MICR like applications with the exception that the images and articles containing magnetically encoded information formed thereby are resistant to distortion, and immune from destruction, under the influence of external magnetic fields.

There remains a need for magnetically recognizable marking materials which are not destroyed or altered under the influence of a external electromagnetic fields and which materials can be used in a wide variety of printing processes and printing devices, such as dry and liquid xerographic printing, ionographic printing, lithographic printing, grauvre printing, thermal ink jet printing, impact printing, and applications. There also remains a need for magnetically recognizable marking materials which are single domain and rotationally free at temperatures of about 10° K. and above.

Still further, there is a need for magnetically recognizable marking materials that permit economical, clean, and optionally dry micron and submicron polymeric composite particles that can be selected for use in a magnetic liquid or solid marking formulations, and utilized as an active component in superparamagnetic marking fluids, gels and solids, and in printing and character recognition processes.

Solutions to the above problems and needs have been unexpectedly found in the compositions and processes of the present invention wherein there is provided superior superparamagnetic marking materials that enable, for example, novel image character recognition processes and printed matter, wherein the individual magnetic moments contained in the nanomagnetic crystalline species contained in the marking material are freely rotating, single domain, and therefore easily and independently oriented in low, intermediate, and high magnetic fields.

In embodiments of the present invention, solutions to the aforementioned problem are provided.

SUMMARY OF THE INVENTION

Examples of objects of the present invention include:

overcoming or minimizing problems encountered in the art by providing magnetically recognizable marking compositions which are superparamagnetic and substantially rotationally free and single domain;

providing processes for readily and economically preparing magnetically recognizable marking compositions containing a superparamagnetic component;

providing magnetically recognizable marking compositions which are adaptable for use in various printing devices and which devices are suitable for forming magnetically recognizable indicia or magnetically encoded and magnetically decipherable information;

providing magnetically recognizable marking compositions which are electrically insulating and are adaptable for use ionongraphic, xerographic, ink jet, impact, offset, magnetographic, magnetolithographic, and the like printing devices;

providing magnetically recognizable marking compositions which, in embodiments, are free of conventional hard magnetic materials, such as magnetite, and which compositions are adaptable for use in superparamagnetic ink character recognition marking, and related marking processes;

providing magnetically recognizable image marking and image recognition processes which do not require the magnetic writing step associated with conventional MICR processes;

providing magnetically recognizable image marking and image recognition processes wherein the recognition of printed images relies on the predetermined size and or shape of the printed character and not on the magnetic field strength generated by the printed image, that is, comparison and matching of a printed image's magnetic size and shape profile to a reference magnetic profile;

providing superparamagnetic marking materials which can be characterized as smart marking materials in that they are capable of reacting intelligently by, for example, responding to the immediate magnetic environment, for example, as manifested by changes in the orientation, motion, or temperature, of the printed image; and providing magnetically recognizable marking compositions which are not damaged or distorted by the influence of external magnetic fields, that is, the images formed in the printing and imaging processes of the present invention are not readily destroyed by demagnetization and therefore provide magnetically recognizable images, processes, and articles with superior robustness and magnetic insensitivity to alteration by extraneous or external magnetic fields.

These and other objects are achieved, in embodiments, of the present invention as described and illustrated herein.

In embodiments, the present invention provides, an image character recognition process comprising: forming an image, for example, by xerographic or liquid ink means, in a predetermined size and shape on a receiver member with a marking composition containing a superparamagnetic component; detecting the predetermined size and shape of the formed image by placing the resulting image bearing receiver member in a magnetic sensing field comprising at least one magnetic sensor and thereafter or simultaneously forming a magnetic size and shape profile map of the detected image, for example, by sensing the magnetic field properties of the detected image and recording the sensed properties on a suitable digital or optical recording media such as magnetic tape or diskette, or compact disk; and recognizing the detected image by comparing the magnetic size and shape profile map of the formed image with reference magnetic profile image maps.

In other embodiments of the present invention, there are provided image character recognition printing process comprising: providing a superparamagnetic image character recognition composition comprising: a magnetic composition comprising nanocomposite particles comprising from about 0.001 to about 60 weight percent of magnetic nanocrystalline particles dispersed in from about 40 to about 99.999 weight percent of a discrete phase matrix; and a continuous phase matrix, wherein the discrete phase resides in interstices within the continuous phase matrix; and forming a printed image with the superparamagnetic image character recognition marking composition on a receiver member, wherein the resulting printed image is superparamagnetic in a magnetic field.

The compositions and processes of the present invention are useful in a variety of magnetically responsive systems, applications, and articles including, for example, liquid and dry marking systems related to but distinct from the aforementioned magnetic ink character recognition systems, and wherein the compositions and processes can be used to form various magnetically secure images and documents such as bank checks, negotiable security instruments, glyph encrypted documents, paper currency, postage stamps, postal marks, credit cards, identification badges, and the like.

BRIEF DESCRIPTION OF THE DRAWINGS

The above and further objects and advantages of the present invention will be readily apparent from the following description of preferred embodiments taken in conjunction with the accompanying drawings.

DETAILED DESCRIPTION OF THE INVENTION

The present invention provides, in embodiments, superparamagnetic image character recognition(SICR) processes comprising, for example, forming an image in a predetermined size and shape on a receiver member with a marking composition containing a superparamagnetic component; detecting the predetermined size and shape of the formed image by placing the resulting image bearing receiver member in a magnetic sensing field comprising at least one magnetic sensor and forming a magnetic size and shape profile map of the detected image; and recognizing the detected image by comparing the magnetic size and shape profile map of the formed image with reference magnetic profile image maps. Recognition is accomplished when the detected image map substantially matches at least one reference image in either or both of the size and shape profiles, or in alternative embodiments, the concentration of the superparamagnetic material contained in the imaged or printed region. A detected image profile which does not substantially match at least one reference image profile is discounted or ignored. In embodiments, a discounted or ignored image can be indicated by various means, for example, activating an alarm system or recording the ignored image by alternative means, such as a photograph to preserve a permanent record of any non conforming image or characters, for example, as may be encountered in situations involving counterfeit currency and related documents.

The term "substantially matching" refers to, in embodiments, a confidence level of from about 80 to about 100 percent that a detected image magnetic size and or shape profile resembles at least one reference image magnetic size and or shape profile.

In embodiments, the superparamagnetic images can be generated with the aforementioned conventional marking means using the superparamagnetic composition and a predetermined size and shape set of characters, for example, it is known to equip electronically controlled printing machines with a font set or selection wherein the size and shape of the characters and images generated therefrom are limited by the availability of font information resident in or provided to the printing machine. Thus, in embodiments of the present invention, the operator or controller of the aforementioned printing process and image forming step specifies the characters which are printed with the superparamagnetic compositions and thereby simultaneously determines that the same character set will be recognizable, that is, the character set or fonts selected for printing are also assigned to the aforementioned image profile reference or lookup table.

In other embodiments of the present invention, there are provided imaging processes which produce magnetically recognizable images and which images have the advantage and superior result of being free of magnetic memory. The images formed in the present invention are therefore highly resistant to magnetic distortion and substantially or completely immune from distruction under the influence of external magnetic fields.

In a preferred embodiment of the present invention there are provided printed image and character recognition processes that are accomplished without a magnetic image and character writing step, or in the alternative, a magnetic image character magnetization step. Thus, the present invention enables character and image recognition processes which are substantially simplified by the elimination of the character magnetization or writing step used in conventional MICR processes.

The present invention provides printed image and character recognition processes wherein the magnetic profile map of the detected image is comprised of, for example, the measured change in magnetic flux density created or caused by the image or character, using, for example, a magnetic sensor such as known magnetic read heads and metal detectors. The comparative reference images or characters of the recognition process can be, for example, magnetic profile image maps that are in a suitable electronic form and reside in, for example, a look up table, which profile maps are resident on the image or character detection and recognition platform, and which platform may be the same or different platform as that used to form the superparamagnetic images and characters.

In other embodiments of the present invention there are provided superparamagnetic image forming and character recognition processes wherein forming of the predetermined size and shape image on a receiver member is accomplished with a marking method selected, for example, from known marking methods such as dry and liquid xerographic printing, ionographic printing, lithographic printing, grauvre printing, thermal ink jet printing, impact printing, magnetographic, magnetolithographic, combinations thereof, and the like methods.

In other embodiments of the present invention there are provided image and character recognition processes which further comprise recording the magnetic profile of the detected image, by a variety of suitable means for preserving a record of the detection and recognition of the selected images, or as appropriate, non recognition of non matching images or characters.

The present invention provides, in embodiments, superparamagnetic image character recognition(SICR) printing processes comprising: providing a superparamagnetic image character recognition composition comprising a magnetic composition comprising nanocomposite particles comprising from about 0.001 to about 60 weight percent of magnetic nanocrystalline particles dispersed in from about 40 to about 99.999 weight percent of a discrete phase matrix; and a continuous phase matrix, wherein the discrete phase resides in interstices within the continuous phase matrix; and forming a predetermined set of printed images and or characters with the superparamagnetic image character recognition marking composition on a receiver member, wherein the resulting printed image is superparamagnetic in the presence of a magnetic field. In other embodiments the aforementioned printing process can employ a marking composition further comprised of at least one toner resin in a total amount of from about 0.5 to about 95 weight percent by weight of the marking composition based on the total weight of solids in the composition. The toner resin can be, for example, known polyesters; polymeric styrenes, dienes, and acrylates, and copolymers thereof; and blends thereof. In embodiments where a toner resin is selected, from 1 to about 10 resins may be selected. The selection of additional toner resins can be used to regulate the physical properties of the marking composition to correspond to desirable printing properties, such as for example, bulk melting properties, image gloss, and glass transition temperature range of the marking formulation.

The marking compositions of the present invention may further comprise useful and functional additives for providing high quality images and highly reliable image forming processes, such as a pigment or colorant for forming full color images; a wax; one or more charge control additives, for example, a mixture of two or more charge additives of different triboelectric charging polarity, and optional, surface additives, for example, fumed silicas to enhance the flow of marking particles during manufacture, shipping, image development and cleaning. When a liquid marking composition is desired, the marking composition can further comprise a liquid carrier vehicle, and which liquid carriers are well known in the art and include, for example, water, hydrocarbons, such as NORPAR® solvents available from Exxon, and the like carrier liquids.

In embodiments of the present invention, for example, wherein xerographic and related marking technologies are selected for forming the superparamagnetic images, the formation of the printed image comprises forming a latent image on a latent image bearing member; developing the latent image with a developer comprising the aforementioned superparamagnetic composition, preferably including one or more toner resins; transferring the resulting developed image to a receiver member; and fixing the resulting transferred image to the receiver. The superparamagnetic marking compositions selected for use in the present invention are magnetically rotationally free and single domain in character, and are free of magnetic memory effects.

The aforementioned superparamagnetic nanocrystalline particles can be, for example, metal oxides, such as $Fe_3O_4$, and the like, elemental metals such as known zero valent magnetic metals, and mixtures thereof, which are from about 0.0001 to about 0.1 microns in volume average diameter. The discrete phase matrix can be, for example, ion exchange resins, ion exchange metal oxides, and mixtures thereof.

The continuous phase matrix can be, in embodiments, a rigid gel comprised of, for example, a mixture of a glycol and hydrophilic fumed metal oxide particles, an alkyl acrylate polymer such as methyl methacrylate, or a liquid gelled acrylic polymer such as ammonium treated acrylic acid polymers as illustrated herein. The continuous phase can be present, in embodiments, in amounts of from about 1 to about 99 weight percent based on the total weight of the magnetic composition. The continuous phase matrix is preferably dispersible in either a suitable liquid media for liquid printing applications or in a suitable friable solid media such as a resin or resins.

The superparamagnetic composites and images formed therewith of the present invention, in embodiments, are free, or substantially free, from magnetic relaxation phenomena when an applied external magnetic field is either varied or is static. The superparamagnetic marking composition of the present invention are free from barriers to a change in system magnetization(M) and possess a magnetic saturation moment of from about 0.1 to about 50 emu per gram. The superparamagnetic marking compositions are, in embodiments, superparamagnetic at from about 4° K. to about 500° K. and instantaneously responsive to, but not permanently magnetized by, a magnetic field.

In embodiments of the present invention, the marking composition can further comprise known magnetic nanoparticulate particles such as ferromagnetic materials, ferrimagnetic materials, and mixtures thereof, reference the aforementioned commonly assigned U.S. Pat. No. 4,474,866, for the purpose of, for example, formulating and forming hybrid characters which are recognizable by and possess the advantages of both the superparamagnetic image character recognition(SICR) process as illustrated herein and by conventional magnetic character recognition(MICR) processes.

The present invention provides, in embodiments, superparamagnetic compositions suitable for use in magnetically recognizable imaging processes and applications which images, processes and applications exhibit unexpected and superior magnetic robustness compared to those available through the known MICR processes. The properties of the superparamagnetic compositions of the present invention enable improved imaging and recognition processes, for example, at from about 4° K. and above. Although not wanting to be limited by theory, it appears that the robustness of the magnetic compositions and recognition processes of the present invention are attributable in large part to the nanoscopic size, non interacting, uniform distribution, and rotationally free disposition of the magnetic species within the ionic exchange matrix, and that the magnetic compositions have a Curie temperature on the order of about 100° to about 400 ° K.

In embodiments of the present invention, there are provided superparamagnetic image character recognition compositions comprising: a magnetic composition comprising nanocomposite particles comprising from about 0.001 to about 60 weight percent of magnetic nanocrystalline particles dispersed in from about 40 to about 99.999 weight percent of a discrete phase matrix; and a continuous phase matrix, wherein the discrete phase resides in interstices within the continuous phase matrix. The rotationally free magnetic component of the dispersed or discontinuous phase is believed to have a nominal domain diameter of from about 10 to about 100 nanometers, and an expected domain volume of about 1,000 to about 1,000,000 cubic nanometers.

Although not wanting to be limited by theory it is believed that the magnetic nanocrystalline particles and discrete phase are contained or substantially encapsulated within interstices or a void or voids between the discrete phase matrix and the continuous phase matrix. The magnetic nanocrystalline particles are believed to be mechanically and magnetically rotationally free and single domain in character as illustrated herein. The magnetic nanocrystalline particles are also believed to be completely or substantially free of magnetic memory as is the bulk superparamagnetic marking composition.

The terms "dispersed phase" and "discrete phase" as used herein can be used interchangeably and refer to the discontinuous phase of the composition which contains the magnetic nanocrystalline particles and the discrete phase matrix, for example, an intimate or mesoscopic dispersion of magnetic nanocrystalline particles dispersed in an ion exchange resin as disclosed in U.S. Pat. No. 4,474,866, to Ziolo, and the aforementioned copending application U.S. Ser. No. 08/290,125 (D/93433).

The magnetic nanocrystalline particles are particles selected from the group consisting of metal oxides, elemental metals, and mixtures thereof, and are readily prepared, reference the aforementioned U.S. Pat. No. 4,474,866, to Ziolo, copending application U.S. Ser. No. 08/290,125 (D/93433); and U.S. Pat. No. 4,238,558 wherein polymer materials are impregnated with a magnetic metal oxide, and elemental metal derived from transition metal carbonyl compounds, respectively.

The discrete phase matrices act as a binder and stabilizing entity for the formation and retention of the magnetic nanocrystalline particles from the appropriate precursor materials. The discrete phase matrix can be any suitable organic or inorganic binder material, such as thermoplastic or thermoset resins, ion exchange resins, ion exchange metal oxides, such as silicon dioxide, which is capable of hosting the magnetic nanocrystalline particles. Other examples of materials useful for the dispersed phase include ion exchangeable polymer resins such as sulfonated polystyrene resins and perfluorinated polysulfonic acid containing resins, and wherein the polymer resin is optionally crosslinked. The dispersed phase matrix can be an inorganic ion exchangeable metal oxide or mixed metal oxide compounds. When the dispersed phase selected is an oriented structure, such as mica or sulfonated graphite, a two dimensional nanomagnetic composition can be formed. Similarly, when a three dimensionally structured material is selected for the dispersed phase, such as, silica or sulfonated ion exchange resins, a three dimensional nanomagnetic composition results.

According to embodiments of the present invention, a crosslinked polymer resin matrix having chemically addressable sites is used to prepare nanomagnetic composites and serves as the discrete phase matrix in magnetic compositions of the present invention. Such a matrix is provided by, for example, an ion exchange resin. Many organic ion exchange resins are based upon a matrix of crosslinked polystyrene which provides a chemically and physically robust micro structure of the type needed to produce the fine particulate nanocomposite. A preferred resin is a polystyrene sulfonic acid (PSSA) ion exchange resin crosslinked from about 1 to 16% with divinylbenzene. More preferably, a 2 to 8% divinylbenzene crosslinked sulfonated polystyrene can be selected. Illustrative examples of suitable ion exchange resins include those polymers possessing chemically addressable sites dispersed throughout their matrix, or on their internal and external surfaces, and which sites can be used to generate an ionic component in situ. Specific examples of these resins include sulfonated and carboxylated polystyrenes, strongly acidic polyphenolics, polysulfonic acids prepared from monomers of the formula $R-CH_2-SO_3^-H^+$, weakly acidic polyacrylics with a pH of about, for example, 5 to 6, for example, polycarboxylic salts prepared from unsaturated monomers of the formula $R-COO^-Na^+$, wherein R is a polymerizable monomer with from 2 to about 20 carbon atoms, for example, unsaturated alkyl, alkylene, arylalkylene or arylalkyl groups, peffluorinated polysulfonic acids, weakly acidic chelating polystyrenes, and the like, with strongly acidic sulfonated polystyrenes and perfluorinated polysulfonic acid salts being preferred. In addition, anionic exchange resins such as Baker IONAC NA-38, Baker IONAC A-554, Dowex SBR, AMBERLITE IRA-400, AMBERLYST, Dowex IX8-100, and NAFION® resins available from DuPont, may also be used. Other suitable resins can be selected by one of ordinary skill in the art provided that they are compatible with the ion exchangeable resin or resins selected and providing they achieve the objectives of the present invention.

The resin selected for the discrete phase matrix is preferably capable of withstanding, during preparation and processing and in various magnetic process applications, repeated cycles of drying, gelling, swelling, and de-swelling, and preferably, will not decompose thermally below 120° C. The resin is preferably chemically unaffected by exposure to strong acids, bases or redox solutions with the exceptions of undergoing the desired ion exchange reactions. The resin may be of an analytical or an industrial grade. Aside from differences in cost and size, the industrial grade resins typically have more color than the analytical grades. Most of the color associated with industrial grade resins is temporary and is easily removed if desired by solvent washing, usually with water or alcohol or mixtures thereof. After washing, the industrial grade resin may retain a weak amber color similar to the analytical grade. Resin beads may be in embodiments, from about 20 to about 500 mesh and are preferably from about 20 to about 400 mesh size or between about 850 and about 38 microns. More preferably, the resin beads are from about 200 to about 400 mesh or between about 75 and 38 microns. The larger size beads have two advantages over the smaller beads. First, the processing time is shorter when using the larger beads due to faster settling rates and ease of decanting. Second, the larger beads are mechanically weaker than the smaller bead due to greater osmotic shock effects during their manufacture. Thus, nanocomposite magnetic material prepared from the larger beads, crushes and presumably micronizes more easily than those made from the smaller beads. Despite its weaker mechanical strength, the lower cost larger resin retains its ion-exchange capability through and even beyond ten-cycles of loading with the magnetic metal precursors of elemental metal species. The smaller sized ion exchange matrix particles have the advantage of being more readily dispersible in a liquid vehicle, for example, the continuous phase prior to solidifying, without the need for additional particle size reduction processing steps. Commercial ion exchange resins for use in the present invention include polystyrene sulfonic acid ion exchange resins which may be obtained from such manufacturers as Rohm and Haas, E. I. DuPont, and Dow Chemical.

Once a resin is selected, the resin matrix is next loaded with the desired precipitate precursor magnetic ion, ions, or metal atom clusters. If a magnetic colloid is selected, this may include several different ions including, for example, ferrous or ferric ions in a manner described in the aforementioned U.S. Pat. No. 4,474,866 to Ziolo.

The magnetic ion loaded resin is thereafter treated so as to cause an in-situ precipitation of the magnetic material desired for dispersion. Gamma-$Fe_2O_3$ and $Fe_3O_4$, for example, separately or in admixture, may be precipitated in this manner. The nanometer size metal ion containing particles may be precipitated as compounds, for example, as iron sulfide clusters, in their elemental forms, or preferably as the metal oxides, reference the aforementioned commonly assigned copending application U.S. Ser. No. 08/290,125 (D/93433).

The nanomagnetic composite resin beads prepared as described above may be dried prior to micronization and then subsequently micronized to produce a dry powder composite for dispersion in a continuous phase, such as a fluid or solid, for example, a non-dissolving liquid dispersion media like alcohol or a polymer. This dispersion of crushed nanomagnetic composite and fluid or solid may subsequently be used to prepare the magnetic composition formulation as illustrated herein.

The continuous phase matrix can be a solid, a gel, or a foam, and is preferably sufficiently viscous to prevent diffusion of the discrete phase matrix within the continuous phase matrix. Thus, in embodiments, the continuous phase matrix can, be a solid, a solidifiable, or a gellable material, and can include freezable liquids including water, and organic solvents, such as an alcohol or mixture of alcohols with from 1 to about 5 carbon atoms at a temperature at or below the freezing point of the alcohol; gellable compositions including surfactants, polymers and metal oxides; polmerizable monomer compounds; rigid foams such as polyurethane foam; and the like materials known to those of ordinary skill in the art.

The continuous phase matrix, in embodiments, can be a gel comprised of a mixture of a glycol and hydrophilic fumed metal oxide particle, for example, a mixture of ethylene glycol and AEROSIL 300® a hydrophilic silica, available from Degussa A. G., readily forms suitable gel compositions when mixed in various portions. The gellation of these mixtures is believed to be attributable to extensive crosslinking of the silica particles by the glycol through hydrogen bonding phenomena.

The continuous phase matrix can, in embodiments, be a solid alkyl acrylate polymer, for example, obtained by photochemically polymerizing alkyl acrylate monomers at lower temperatures, using the known acrylate polymer matrix isolation technique, prior to or during the formation and generation of the rotationally free magnetic particles.

In still other embodiments, the continuous phase matrix can be a gelled acrylic polymer, such as CARBOPOL™ polymers available from Cabot Corporation, and which gelling is readily affected by physical means, such as adding or removing solvent, or by chemical means, such as changing pH with, for example, alkali or ammonia. Another example is an ionically conductive gel compound of 4 weight percent acrylic acid neutralized with NaOH containing 96 weight percent water.

The aforementioned interstices, although not wanting to be limited by is theory, are believed to be a multiplicity of voids within the continuous phase matrix which may form when the solid composition is exposed to a pulsed magnetic field. Interstices are believed substantially spherical in shape and from about 0.001 to about 1.0 micron in diameter, and preferably from about 0.005 to about 0.1 microns in diameter.

Compositions of the present invention are believed to be substantially or entirely free of magnetic interaction between neighboring magnetic nanocrystalline particles, and adjacent discrete phase matrix particles. That is, the nanocrystalline particles residing within the individual discrete phase matrix particles are substantially or completely isolated from other discrete phase matrix particles and there exists substantially no interparticle interaction, for example, physically or magnetically. Thus, compositions of the present invention are substantially free of barriers to changes in system magnetization(M). Consequently, the magnetic response of the compositions is infinite up to about the saturation magnetization of the composition upon application of a magnetic field (H) of from about $10^{-8}$ to about 10 Tesla. In embodiments, the initial magnetic saturation of the composition is from about 0.01 emu per gram to about the bulk saturation magnetization of the composition. The compositions can have a magnetic saturation moment of 0.1 to about 50 emu per gram and an initial magnetic permeability of greater than about 1.1. In other embodiments, for example, when the compositions are formulated with a discrete phase in an amount of from about 0.1 to about 20 weight percent, and preferably from about 1.0 to about 10 weight percent, with respect to combined weight of the discrete phase and continuous phase.

In embodiments, the compositions of the present invention are electrically nonconductive. However, the compositions if desired can, in embodiments, be made electrically conductive without compromising the magnetic properties of the composition or of the discrete phase particles by inclusion of small amounts of known conductive salts into, for example, a composition wherein continuous phase is comprised of a gel, as mentioned above, which allows for the electrical diffusion of ions within the continuous phase gel but precludes the migration or mobility of considerably larger sized and smaller charge density discrete phase particles.

The compositions of the present invention, in embodiments, are superparamagnetic at above about 4° K. to about 500° K. and are instantaneously responsive to a magnetic field so long as the integrity, that is the separation of the discrete phase particles therein, of the continuous matrix is maintained. Thus, when the isolation and separation of individual or neighboring discrete phase particles is preserved, as for example, when the continuous phase retains solid, gel, or rigid foam phase characteristics which preclude discrete phase particle diffusion, the superparamagnetic behavior persists indefinitely.

For at least these reasons, although not wanting to be limited by theory, it is believed that the compositions of the present invention are, substantially free of quantum tunneling of magnetization above 0° K., and more specifically from about 0° K. to about 10° K.

The magnetic nanocrystalline particles residing within the discrete or disperse phase particles can, in embodiments, be formed from magnetic metal ions selected from the group consisting of transition metal elements, a lanthanide series element, and mixtures thereof. In preferred embodiments, the magnetic nanocrystalline particles are nanoscopic or mesoscopic in size, and are comprised of gamma phase iron oxide particles uniformly dispersed in the discrete phase. In other embodiments of the present invention, the magnetic compositions can include, in addition to the aforementioned superparamagnetic particles, magnetic nanoparticulate particles selected from the group consisting of ferro-, ferri-, and mixtures thereof, that is, non-superparamagnetic particles.

In embodiments, the nanocrystalline particles contained in the discrete phase, and the discrete phase particles themselves are both physically separated from the walls of the interstices formed by and within the continuous phase matrix. The interstices, although not wanting to be limited by theory, are believed to be voids or vacuoles which are formed by, or result from the action of a magnetic field upon the isolated magnetic discrete phase particles in a solid, foam, or gelled continuous phase matrix as illustrated herein. The interstices can, in embodiments, be vacuum or filled with ambient atmosphere, such as an inert gas or air, depending upon the gas diffusion and gas permeability properties of the surrounding continuous matrix.

The present invention provides, in embodiments, processes for preparing a superparamagnetic imaging composition comprising: providing a magnetic nanocomposite comprising from about 0.001 to about 60 weight percent of magnetic nanocrystalline particles residing within from about 40 to about 99.999 weight percent of a discrete phase to form a dispersed phase matrix; optionally grinding the nanocomposite; optionally drying the nanocomposite; dispersing the resulting dispersed phase matrix in a continuous phase and thereafter solidifying the resulting mixture to form a thermally, mechanically, and magnetically stable and uniform dispersion of the discrete phase matrix, for example, in the form of submicron sized particles, in the continuous phase matrix; and applying a magnetic field to the resulting stable mixture to form interstices or voids between the dispersed phase matrix particles and the continuous phase matrix and wherein the dispersed phase matrix particles are physically separated from the walls of the interstices within the continuous phase matrix thereby providing a collection of discrete, rotationally free single domain magnetic particles.

The aforementioned magnetic field, in embodiments, is preferably a singly or continuously pulsed magnetic field. The strength of the magnetic field can, in embodiments, be, for example, from about 0.002 to about 1 Tesla. The magnetic field used to magnetize the magnet compositions can be provided by known magnetic devices, for example, a refrigerated electromagnet, a superconducting magnet, a switchable on/off electromagnet, a non-refrigerated electromagnet, and a permanent magnet or magnets, or combinations thereof. A pulsed or inverting magnetic field is preferred in embodiments. The nanomagnetic compositions obtained in accordance with the present invention can be used in a variety of ancillary magnetic devices and processes with magnetic field strengths of less than about 10 Tesla. The nanomagnetic compositions of the present invention are compositionally robust and quite stable to, for example, extensive magnetic pulsing or thermal cycling, for example, in excess of several million cycles, if the compositions are maintained in the aforespecified non-diffusing non interacting solid, foam, or gel states.

Suitable discrete phase and continuous phase matrices useful in the preparative process are as defined above. In embodiments of the present invention, depending upon the continuous phase matrix selected, for example, organic solvents or surfactants with melting points or gel points below or in the range of from about 0° to about 50° C., the magnetic composition can exhibit thixotropic properties at from about 0° to about 50° C.

In embodiments of the present invention, the rotationally free single domain magnetic properties of the magnetic compositions can disappear when the continuous matrix is converted from a solid, foam, or gel to a free flowing liquid. The rotationally free single domain magnetic properties of the magnetic compositions can reappear when the continuous matrix is reconverted or reconstituted from a liquid back to a solid or gel. Thus, the rotationally free single domain magnetic properties of the nanomagnetic composites of the present invention appear to be reversible and depend in part upon the mobility and the degree of dispersion of the discrete phase within the continuous phase.

Although not wanting to be limited by theory, it is believed that the magnetic composites of the present invention are free from magnetic relaxation phenomena when an external magnetic field surrounding or acting on the magnetic compositions is varied. The presence of this physical phenomena enables several important applications, such as magnetic permeability sensing processes, and superparamagnetic image character recognition processes as illustrated herein.

The aforementioned sensing electromagnetic fields can be independently generated by, for example, electrical currents, sound waves, gravity, mechanical motion, applied magnetic fields, geomagnetic fields, biomagnetic fields, and combinations thereof. The measurement of the relative and absolute size and shape of the printed images and characters can be accomplished by various ways known to one of ordinary skill in the art, for example, electrically, magnetically, acoustically, and the like methods, and wherein the detected image is compared to reference image information and a comparison and recognition is attempted.

Magnetic compositions of the present invention can be characterized, in embodiments, as "smart materials" in that the compositions are capable of reacting intelligently, for example, by responding to the immediate magnetic environment, for example, as manifested by changes in the orientation, motion, or temperature, of the composition and images prepared therefrom. The magnetic compositions of the present invention provide magnetic materials with high initial and long lived magnetic permeability.

Rotationally free, single domain nanomagnet compositions and processes for making and using, as disclosed in the present invention, can be achieved by one of ordinary skill in the art upon comprehending the teachings herein and in commonly owned and assigned U.S. Pat. Nos. 5,358,659 and copending applications U.S. Ser. No. 08/500,215 (D/94863) which provide for forming magnetic nanocomposites, for example, by providing an ion exchange matrix; loading the matrix with an ion capable of forming a magnetic phase; treating the loaded matrix to cause in situ formation of magnetic particles or magnetic nanoclusters, and optionally isolating and sizing the nanocomposite particles as desired; dispersing the resulting nanocomposite particles comprising a discrete or discontinuous phase in a suitable continuous matrix; and solidifying the continuous matrix, the disclosures of which are incorporated herein in their entirety.

In embodiments of the present invention, the liquid medium or liquid vehicle provides a suitable dispersion and solidification medium for the nanocomposite therein, and optionally if desired a gel forming component. A variety of liquids or liquid mixtures may be selected as a suitable liquid media. Upon cooling the mixture comprised of the nanocomposite dispersed in the liquid media to below about 200° to about 400° K., a solid or gelatinous matrix results. Preferably, the liquid or mixture of liquids does not dissolve or solubilize the nanocomposite particles or the ion exchange matrix to any extent, nor is the liquid media substantially physically or chemically altered by the application of a magnetic field. Examples of suitable liquids include water, alcohols, polyols, glycols, glycol ethers, ethers, and liquid metals, such as mercury, gallium, and mixtures thereof. Thus, in embodiments, the magnetic composition may be formulated in pure methanol, or alternatively, in a mixture of alcohols. The liquid media in admixture with the nanomagnetic composite preferably forms a rigid solid, gel, or foam when cooled to below about 300° K., or when induced by, for example, chemical, photochemical, and the like means, for effecting the aforementioned phase transition.

Although not wanting to be limited by theory it is believed that the aforementioned magnetic nanocrystalline particles are initially, physically and or chemically, bonded to the ion exchange matrix comprising the host or discrete matrix and uniformly dispersed therein, as disclosed in the aforementioned commonly assigned U.S. Patents and copending applications. Upon exposure of the subsequently solidified cooled liquid or gelled nanocomposite dispersion, to an applied magnetic field, and preferably a pulsed magnetic field, the nanocrystalline particles become partially or entirely physically disassociated from the cooled or solidified matrix while remaining compartmentalized within the cooled or solidified matrix and thereby become apparently nanomagnetic in accordance with the measured physical properties as illustrated herein. Thus, the aforementioned applied magnetic field pulse "snaps" or separates the magnetic nanocrystalline particles free from direct physical or chemical association with the ion exchange matrix so that the nanocrystalline particles are free to mechanically rotate or orient in a suitable magnetic field of relatively low strength at temperatures between 0° and 300° K., and in preferred embodiments, at temperatures above about 300° K. The separated particles rotate freely in response to applied magnetic fields at least as low as 0.001 Tesla. Initially, when the nanocomposite or discrete matrix is dispersed in the liquid medium, for example, at room temperature, the magnetic spin moments of the magnetic nanocomposites are substantially randomly oriented. Upon cooling the gelled matrix, but prior to application of an external magnetic field, the magnetically active particles reside upon the walls of hollows or cavities formed within the solid or gelled matrix upon cooling to low temperatures, for example, below about 10° to about 200° K. Upon application of a suitable magnetic field of from about 0.2 to about 1 Tesla, or upon sudden reversal of the direction of the magnetic field, the magnetic nanocomposite particles separate from the continuous matrix comprised of the solid or gel medium and remain isolated, that is magnetically non-interacting. In the isolated state, the nanocomposite particles exhibits Curie-Weiss behavior and are free of magnetic hysteresis, and which observations are consistent with a large collection of rationally free, independent nanomagnets. Thus, the rotationally free magnetic composites of the present invention provide nanocompass particles suitable for use in the aforementioned applications and processes.

Superparamagnetic marking compositions and image character recognition processes enabled therewith of the present invention are differentiated from known MICR composition and processes in that they exhibit the aforementioned combined magnetic properties and superior magnetic stabilities and immunities.

The superparamagnetic marking compositions of the present invention can, in embodiments, include optional additives, such as additives to control or enhance the magnetic, flow, and performance properties and utility of the resulting formulated composition, such as colorants, security taggants, radiographic-labels, contamination or wear indicators, fragrance or odorants, corrosion inhibitors, humectants, viscosity improvers, and the like.

Nanomagnetic nanocrystalline metal oxide or elemental metal particles of the present invention can be formed from for example, magnetic metal ions such as transition metal elements, such as iron, nickel, manganese, a lanthanide series element, and mixtures thereof, using preparative techniques and methodologies, for example, as disclosed in the aforementioned commonly owned and assigned issued U.S. Patents and copending applications, and as illustrated herein.

In embodiments of the present invention, where cooling is required the nanomagnetic compositions may be cooled by conventional mechanical, chemical and physical refrigeration means known to one of ordinary skill in the art.

A preferred nanomagnetic composition in embodiments of the present invention, comprises a nanocomposite comprising nano-scale gamma phase iron oxide particles highly dispersed in an ion exchange polymer resin or inorganic ion exchange compound. The nanomagnetic composition, in embodiments, is readily dispersed, and thereafter spontaneously gelled, in a liquid vehicle, for example, an alcohol mixture, using known mechanical mixing equipment, separate from or in conjunction with the aforementioned refrigeration means.

From the foregoing it should be evident that the superparamagnetic marking compositions of the present invention process unique properties and formulation latitude, for example, when a marking composition is formulated as liquid dispersion of the magnetic composite and then jetted in an ink jet type printing apparatus onto a paper receiver, the nanocomposite particles in the resulting dry images are sufficiently well dispersed and isolated from adjacent nanocomposite species so as to be magnetically non-interacting and exhibit the desired superparamagnetic properties without the need for reconstituting the solid form of the composition.

The magnetic composites of the present invention include submicron magnetically susceptible solid nanocomposite particles dispersed in a compatible liquid medium, and submicron nanomagnetically susceptible solid nanocomposite particles dispersed in a compatible solid. The compatible solid can be selected from known materials, such as a frozen or gelled liquid, binder resins other than the aforementioned ion exchange resins, rubbers, cellulosics, glasses, and the like solid vehicles. The solid vehicles are preferably friable under moderate to high or intense shear using mechanical means, such as roll and shot milling, while the solid vehicles are preferably resistant to degradation under the relatively low shear situation associated with the gelling and dispersion conditions.

Useful ion exchange polymer resins include sulfonated polystyrene resins, optionally crosslinked with, for example, divinyl benzene, and perfluorinated polysulfonic acid containing resins. Alternatively, the ion exchange matrix selected can be inorganic ion exchangeable metal oxide and mixed metal oxide compound or compounds, for example, known natural and synthetic zeolites and molecular sieves, and inorganic layered compounds, such as hydrotalcites and mica, and mixtures thereof. The ionic exchange matrix selected is preferably an organic ion exchange resin which provides a polymeric dispersion support matrix and nucleation sites during the formation of the magnetic nanocrystalline particles.

The mesoscopic and nanosuperparamagnetic particles are preferably selected based on an empirical determination of their respective nanomagnetic properties. The nanomagnetic particles are, in embodiments, from about 1 to about 100 nanometers in mean particle diameter, preferably from about 1.0 to about 50 nanometers, and more preferably from about 5 to about 10 nanometers in diameter.

Once the nanomagnetic composite material has been formed, the ion exchange process and subsequent formation of particles may then be repeated several times to achieve higher loading of magnetic species in the composite particles. As the number of particles increases or their size increases the crosslinked ion-exchange polymer matrix becomes stressed and eventually ruptures. In a typical ion exchange resin, sufficient stress may occur after the first loading. Rupture of the composite particles may be easily detected for example, texturally, visually or microscopically.

Micronization, by for example, ball-milling of the composite product in a stable liquid or solid medium or vehicle will lead to the formation of the stable dispersion of the nanomagnetic composite material in about 30 to about 180 minutes. A suitable vehicle is any vehicle which allows dispersion including, for example, alcohols and alcohol miscible liquids and the like solvents, such as methanol and ethylene glycol. Examples of suitable liquid vehicles include known liquids including water, alcohols, polyols, glycols, glycol ethers, ethers, and liquid metals, such as mercury, gallium, and mixtures thereof. Thus, in embodiments, the nanomagnetic compositions may be formulated in, for example, methanol, or alternatively, a mixture of methanol and other miscible alcohols. The liquid medium may further include any liquid material which does not adversely effect the desired magnetic, mechanical, electrical or optical properties of the nanomagnetic composition or performance of the composition in various magnetic process applications, for example, alcohol soluble or miscible polymers or surfactants. The resulting liquid dispersion is suitable as a liquid marking composition for use SICR printing processes of the present invention..

Micronization as used herein is defined as the formation of a liquid or solid mixture through mechanical comminution of the polymeric or inorganic matrix particles containing the discrete nanocrystalline nanomagnetic particles. Micronization may be accomplished by attrition, air attrition followed by dispersion in alcohol, shaking, milling, ball milling, shaking or ball milling directly in alcohol, or the like media. Shaking or ball milling are generally preferred for simplicity and economy. Coarse particles may be removed by filtration or centrifugation if desired although additional separations or removal of large sized particles is generally believed to be, in embodiments, unnecessary.

When using submicron resin particles, no micronization step is required to form a stable colloid. A micronization step may however, be used with a submicron resin if smaller submicron particles are desired.

When a micronization step is selected, grinding or milling time is greatly reduced due to the friable nature of the nanomagnetic nanocomposite. According to the present invention, submicron particles may be produced by growing or building from the molecular level rather than grinding larger particles down to form smaller particles. Thus, in embodiments, the ionic polymeric matrix can be formed using known submicron particle size polymerization techniques followed by in situ impregnation or formation of the magnetic nanocrystalline particles with the resulting submicron sized polymer matrix.

In exemplary examples of submicron resins, diafiltration techniques can be used in place of conventional ion exchange techniques to process the resin because of the very small size of the resin beads. The submicron resin beads may be suspended in an aqueous colloidal form prior to incorporation of the precursor metal ions, thus resulting in a stable colloidal dispersion of the resin and magnetic nanocrystalline particles subsequent to appropriate chemical treatment to convert the ionically associated metal ion species to the desired magnetic species. The nanomagnetically impregnated resin beads may be removed from the dispersed or colloidal condition and dried to form a dry nanomagnetic nanocomposite if desired for added convenience shipping, storing, and subsequent handling, for example, dispersing and gelling the nanocomposite in alcoholic media.

Ultrafiltration is a known pressure-activated membrane filtration process capable of performing a variety of selective molecular separations. For a discussion of this technology see Breslau, B. R., "Ultrafiltration, Theory and Practice," paper presented at the 1982 Corn Refiners Association Scientific Conference, Lincolnshire, Ill., Jun. 16–18, 1982, which is incorporated herein by reference in its entirety. In ultrafiltration, the process fluid flows across a membrane with pore diameters in the range of 10 to 200 Angstroms. Solvents and species whose molecular size and weight are below the molecular weight cut-off will permeate through the membrane and emerge as an ultrafiltrate, while rejected species are progressively concentrated in the retentate process stream. Ultrafiltration differs from reverse osmosis in that it employs a more "porous" membrane which will not retain low molecular weight species such as solvent molecules, rather the membrane separation application is based on particle size. Ultrafiltration covers the particle diameter range of $10^{-3}$ to $10^2$ microns. Alternatively, the resin selected may be submicron in size, for example, less than about 1 micron, from about 0.01 to about 1.0 micron, and preferably from about 0.05 to about 0.5 microns, so that no additional micronization step is necessary. Examples of such a matrix include a submicron sulfonated polystyrene resin, designated SSPR for the purposes of the present invention, and is available from Rohm & Haas in emulsion form. Additional submicron resins appropriate for use in the present invention include any submicron resins which accomplish the objects of the present invention and which do not interfere with the characteristics of the desired material properties disclosed herein.

The following is illustrative of the invention embodied herein. All amounts are by weight percent unless specified otherwise.

EXAMPLE I

Preparation of Nanomagnetic Composition

A nanocomposite containing 57 percent by weight gamma $Fe_2O_3$ in a 4 weight percent cross-linked sulfonated polystyrene ion exchange resin was prepared in accordance with, for example, the aforementioned U.S. Pat. No. 4,474,866, the disclosure of which is incorporated by reference herein in its entirety. A methanol based ferrofluid was then prepared from the nanocomposite and micronized before use as follows. Two grams of the starting nanocomposite were placed in a 4 ounce, wide mouth jar (4.5 cm O.D.) with 300 grams of ¼ inch 440 stainless steel shot. The contents of the jar were roll milled for 120 hours in the dry state and then again for 16 hours after the addition of 40 mL of methanol. The resulting fluid was centrifuged at 8,500 g for four 15 minute intervals. The fluid was then concentrated to 10 mL by ultrafiltration in an AMICON 8200 stirred cell under 36 psi of nitrogen using a cellulose membrane with an average pore size of 40 nanometers. Analysis of the ferrofluid showed 8.8 percent by weight total solids as measured after evaporative drying under vacuum at 100 C for 1 hour, and 2.1 weight percent iron by atomic absorption. Transmission electron microscopy(TEM) of the evaporated ferrofluid with selected area electron diffraction showed no change in the size, shape, or composition of the particles from those of the starting material. The micrograph showed islands of dried ferrofluid containing polymer and clusters of gamma-$Fe_2O_3$ nanocrystals ranging in size up to about 10 nanometers. The methanolic ferrofluid exhibited thixotropic behavior, that is, upon standing the ferrofluid slowly gels and then undergoes reversible liquefaction upon shaking. The free magnet composite could be obtained by starting with either the liquid or the gel form.

Magnetic characterization of this and other nanomagnetic compositions was accomplished using a SHE-SQUID magnetometer with a KEVLAR® sample holder. Low field magnetization versus temperature measurements of the ferrofluid for the zero field cooled (ZFC) and field cooled (FC) measurements, indicated the existence of irreversibility phenomena associated with metastable magnetic states. Similar behavior was observed for the nanocrystalline gamma-$Fe_2O_3$ in the solid polymer. A broad peak in the ZFC curve is believed to be attributable to the broad distribution of energy barriers and relaxation times of the magnetic moments while the maximum in the ZFC data at $T_b=160°$ K. corresponds to the blocking of the random orientations of the anisotropy direction of each particle. The irreversibility between the ZFC and FC curves begins at a temperature above the $T_b$.

Figure 1A:
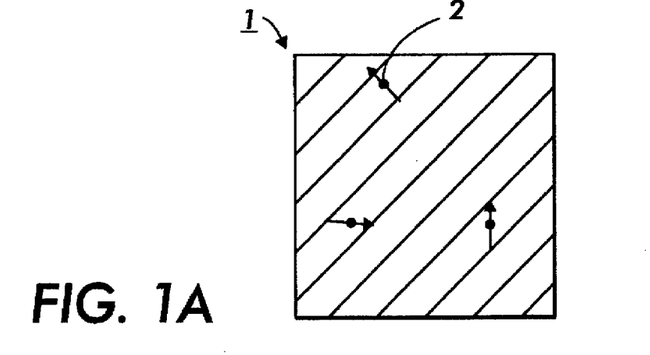
FIG. 1a is a schematic illustration of randomly oriented magnetic dipoles of a magnetic material dispersed in a liquid or a solid matrix.
Figure 1B:
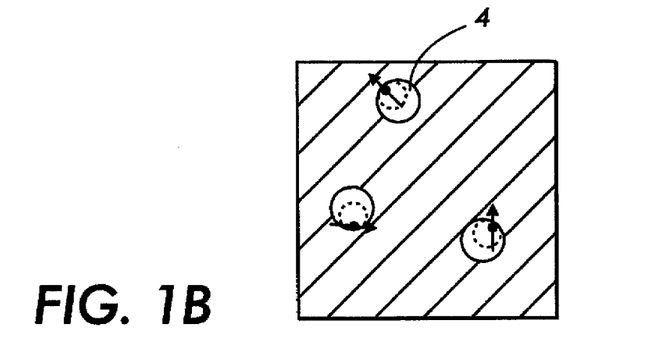
FIG. 1b is a schematic illustration of the formation and magnetic behavior of randomly oriented, rotationally free, single domain nanomagnetic composites of the present invention formed upon solidifying the surrounding media or continuous matrix in the absence of an external field.
Figure 1C:
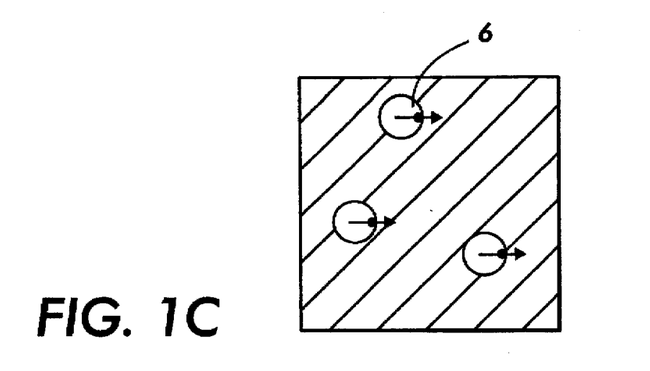
FIG. 1c is a schematic illustration of highly oriented and non interacting magnetic behavior of the rotationally free, single domain magnetic nanocomposites of the present invention in the presence of an external electromagnetic field.

With reference to the figures, FIGS. 1a to 1c illustrate different particle-matrix coupled states which could account for the observed magnetic properties of the nanomagnetic compositions of the present invention. FIG. 1a is a schematic of magnetic dipoles randomly oriented in a solid matrix in the absence of a magnetic field, and which phenomena is well known. FIG. 1a illustrates the most typical or expected state, wherein the particles are entirely encapsulated by the matrix with direct large surface interfacial coupling. FIG. 1b illustrates the formation upon cooling and random magnetic orientation of the rotationally free single domain nanomagnet particles of the present invention in the absence of an external field. In FIG. 1b, the particles are confined in cavities where interfacial coupling is much smaller and possibly at a minimum. For a matrix that undergoes contraction upon cooling, a cavity matrix is expected. FIG. 1c illustrates the compartmentalized and independent oriented magnetic behavior of the rotationally free, single domain nanomagnetic particles of the present invention in the presence of an external field.

At room temperatures, for example about 25° C., the material exhibits superparamagnetic properties consistent with the presence of nanoscale particles. The isothermal variation of the magnetization with the magnetic field (H) at 290° K. demonstrates the absence of remanence and coercivity characteristics of superparamagnetic behavior at this temperature. Below $T_b$, the sample shows characteristic hysteresis in the magnetization versus the magnetic field curves. These data are consistent with nano-scale particles physically or chemically attached to the ion exchange matrix.

The sample was then cooled in a zero applied field to about 6° K. and subjected to a magnetic field larger than 0.5 Tesla. Magnetic characterizations of the system were then carried out using both low and high magnetic fields. The M H) curve was recorded at about 6° K. for the nanocomposite after the applied magnetic field treatment. The data indicate sequentially the way in which the field was varied. Though the sample is at temperature well below the blocking temperature, there is no coercivity. There is, however, a remanence magnetization which changes its sign after applying a very small negative field. This suggests that the irreversibility observed in M(H) curves is due purely to the random directions of the magnetic moments of the particles in the polymer matrix which depend on the magnetic history of the sample. Very small fields produced a full reversal of the total magnetic moment of the system, which suggests that the nanoparticulate is virtually free and unencumbered to rotate in a presumably cavitied or cavitated environment. This assumption was further tested by doing low field magnetization measurements on the sample.

The magnetization versus temperature plot for a cavitated, or in the alternative, particle-matrix decoupled sample, in an applied field of about 0.002 T is dramatically and unexpectedly changed from that observed for the same sample prior to exposure to a magnetic field. The new dependence of the field treated sample is typical of that for a paramagnetic system showing Curie or Curie-Weiss behavior. The data collectively indicate that there are no barriers to the orientation of the magnetic moments of the particles along the applied magnetic field. Since the anisotropy constant of the particles can not be zero, although not wanting to be limited by theory, an interpretation of the dependence is that each particle with its own magnetic moment rotates freely in the matrix in an applied magnetic field. Particle rotation in an applied field is observed in ferrofluids but is damped by the viscosity of the liquid matrix. In the present invention, wherein the initially formed nanomagnetic composition is a solid or highly viscous gel, viscosity effects are negligible. At least at low temperatures, the nanomagnetic particles in the composite appear to be in a virtual partial vacuum. The magnetic compositions of the present invention exhibit a nearly linear dependence of inverse magnetic susceptibility versus temperature, up to about 150° K. and is close to the Curie-Weiss behavior observed for free spin systems. In the superparamagnetic regime beyond a plateau appearing between 175° and 250° K., this behavior is also observed because the thermal energy is larger than the barriers against the change of direction of the magnetic moments. Although the system is well below the blocking temperature, paramagnetic behavior is still observed. The value of the Curie-Weiss temperature, is non zero and may be indicative of: frictional interactions between the nanomagnetic particle and the matrix, a small population of matrix coupled particles, the occupancy of more than one particle per cavity, and possible residual magnetic dipolar interaction between the particles.

EXAMPLE II

Toner Preparation

A black superparamagnetic toner composition comprised of a mechanical mixture of 32 grams of a styrene n-butylmethacrylate copolymer resin, containing 58 percent by weight of styrene and 42 percent by weight of butylmethacrylate, 44 grams of the superparamagnetic resin prepared, according to Example I, and 0.5 grams cetyl pyridinium chloride charge additive is prepared by roll milling in a jar for about 2 hours. This mixture is then melt-blended on a two-roll rubber mill and pre-ground using a hammermill. The resulting coarse particulate is micronized to toner size particles, of about 11 microns average diameter, on a Sturtevant Fluid Energy mill. There is obtained a black superparamagnetic toner.

A xerographic image is generated by forming a latent image on a selenium photoreceptor, and this image is developed with a two component developer formed from the above prepared toner particles, and 0.75 weight percent KYNAR® coated steel core carrier particles of about 90 microns in diameter.

EXAMPLE III

Thermal Ink Jet Formulation

An ink composition comprising 2.5 percent by weight of the micronized material of either Example I or Example II, 15 percent by weight of cyclohexyl pyrrolidone (from GAF Corporation, Wayne, N.J.), 1 percent by weight of sodium lauryl sulfate (from Fisher Scientific, Fair Lawn, N.J.), and 81.5 percent by weight of toluene is prepared by mixing the ingredients together at room temperature, 25° C., with stirring to obtain a uniform mixture, and filtering. The resulting ink can be incorporated into a thermal ink jet test fixture. It is believed that images of excellent resolution with no substantial background deposits can be obtained.

Two additional inks can also be prepared, these inks being of the same composition as above except that one contained 0.1 percent by weight of CARBOWAX M20TM a polyethylene oxide/bisphenol, a polymer of the formula:

with a molecular weight ($M_w$) of 18,000 (from Union Carbide Corporation, Danbury, Conn.) wherein x and y are in approximately equal amounts, and 2.4 percent by weight of the magnetic nanocomposite of Example I, and the second ink contained 0.3 percent by weight of CARBOWAX M20TM and 2.2 percent by weight of the magnetic nanocomposite of Example I. The CARBOWAX M20TM is added to the ink at room temperature and the resulting mixture is stirred for about 5 minutes to obtain a uniform mixture.

EXAMPLE IV

Superparamagnetic Image Character Recognition Process

The toner and developer composition prepared in accordance with Example II is used to develop latent images generated in a Xerox Corporation Model 9700™ MICR printer apparatus that is modified for development of latent images with superparamagnetic toner. The images are fused with a hard roll fuser, affording personal checks with superparamagnetic images and characters thereon. The formed images possess a known or predetermined size and shape and are predetermined by the font type shape and size as selected by the operator and as supported by the particular printer and reader platforms selected. The resulting images are processed with an IBM Corporation Model 3890™ reader/sorter which is adapted to detect, recognize and magnetically record the image profile map of the aforementioned printed superparamagnetic images and characters and to ignore those images which do not substantially correspond to within about 90 percent confidence level of both size and shape profiles of the reference image and character profile maps and which reference images and character profiles are made resident in the memory of the reader/sorter or supplied thereto by equivalent electronic means, such as a remote reference map profile database.

EXAMPLE V

Superparamagnetic Image Character Recognition Process

The process of Example IV is followed with the exception that the ink developer composition prepared in accordance with Example III is selected to develop latent images and a suitable liquid marking apparatus is selected to apply the liquid developer to a suitable receiver member, such as a preprinted paper document, for example a bank check. The resulting printed images and characters are processed as in Example IV with the result that a high level of fidelity of image detection and recognition of the preselected font set is achieved.

In the rotationally free nanomagnetic materials and marking compositions of the present invention, the magnetic moment of a free particle can not tunnel between two orientations since this would violate conservation of the total angular momentum. No hysteresis is expected in a system of rotationally free particles because the particles rotate physically in response to field variations.

In embodiments, at least two principal advantages of the free magnetic systems of the present invention are: the high initial permeability, which is comparable or superior to that of extremely soft ferromagnetic materials; and the absence of time dependent phenomena subsequent to a field variation. Known magnetic materials typically exhibit quantum tunneling of magnetization at low temperatures, typically below 10° K., and especially below 2° K., and Neel relaxation at higher temperatures, typically at greater than 10° K., and especially above about 100° K., when the magnetic field is changed which behavior does not appear to be present in the compositions of the present invention.

In addition to direct current (dc) magnetic data, alternating current (ac) magnetic measurements and Mossbauer spectroscopic data were obtained for nanomagnetic composites, and for dry and liquid developer formulations of the present invention, and indicated freely rotating nanoscopic iron oxide particles.

The aforementioned patents and publications are incorporated by reference herein in their entirety. Other modifications of the present invention may occur to those skilled in the art based upon a review of the present application and these modifications, including equivalents thereof, are intended to be included within the scope of the present invention.

What is claimed is:

1. An image character recognition printing process comprising:

providing a superparamagnetic image character recognition composition comprising: a magnetic composition comprising nanocomposite particles comprising from about 0.001 to about 60 weight percent of magnetic nanocrystalline particles dispersed in from about 40 to about 99.999 weight percent of a discrete phase matrix; and a continuous phase matrix, wherein the discrete phase resides in interstices within the continuous phase matrix; and forming a printed image with said superparamagnetic image character recognition marking composition on a receiver member, wherein the resulting printed image is superparamagnetic in a magnetic field.

2. A process in accordance with claim 1 wherein the marking composition further comprises at least one toner resin in an amount of from about 0.5 to about 95 weight percent by weight of the total weight of the marking composition.

3. A process in accordance with claim 2 wherein said at least one toner resin is selected from the group consisting of polyesters; styrene, diene, and acrylate polymers, and copolymers; and blends thereof.

4. A process in accordance with claim 2 wherein said at least one toner resin is from 1 to about 10 resins.

5. A process in accordance with claim 1 wherein the formation of the printed image comprises forming a latent image on a latent image bearing member; developing the latent image with a developer comprising the superparamagnetic composition; transferring the resulting developed image to a receiver member; and fixing the resulting transferred image to the receiver.

6. A process in accordance with claim 1 wherein the formation of the printed image is accomplished with a printing method selected from the group consisting of dry and liquid xerographic printing, ionographic printing, lithographic printing, grauvre printing, thermal ink jet printing, impact printing, and combinations thereof.

7. A process according to claim 1 wherein the marking composition further comprises an pigment or colorant; a wax; at least one charge control additive; and an optional surface additive.

8. A process according to claim 1 wherein the marking composition further comprises a liquid carrier vehicle.

9. A process according to claim 1 wherein the superparamagnetic marking composition is magnetically rotationally free and single domain in character.

10. A process in accordance with claim 1 wherein the superparamagnetic marking composition is free of magnetic memory effects.

11. A process in accordance with claim 1 wherein the magnetic nanocrystalline particles are selected from the group consisting of metal oxides, elemental metals, and mixtures thereof.

12. A process in accordance with claim 1 wherein the magnetic nanocrystalline particles are from about 0.0001 to about 0.1 microns in volume average diameter.

13. A process in accordance with claim 1 wherein the discrete phase matrix is selected from the group consisting ion exchange resins, ion exchange metal oxides, and mixtures thereof.

14. A process in accordance with claim 1 wherein the continuous phase matrix is a rigid gel comprised of a mixture of a glycol and hydrophilic fumed metal oxide particles.

15. A process in accordance with claim 1 wherein the continuous phase matrix is an alkyl acrylate polymer.

16. A process in accordance with claim 1 wherein the continuous phase matrix is a liquid gelled acrylic polymer.

17. A process in accordance with claim 1 wherein the superparamagnetic marking composition is substantially free of barriers to a change in system magnetization(M).

18. A process in accordance with claim 1 wherein the superparamagnetic marking composition has a magnetic saturation moment of 0.1 to about 30 emu per gram.

19. A process in accordance with claim 1 wherein the superparamagnetic marking composition is superparamagnetic at from about 4° K. to about 500° K. and is substantially instantaneously responsive to a magnetic field.

20. A process in accordance with claim 1 wherein the marking composition further comprises magnetic nanoparticulate particles selected from the group consisting of ferromagnetic materials, ferrimagnetic materials, and mixtures thereof.

21. A process in accordance with claim 1 wherein the continuous phase is present in an amount of from about 1 to about 99 weight percent based on the total weight of the magnetic composition.

22. A process in accordance with claim 1, wherein the magnetic composite and the image formed therewith is free from magnetic relaxation phenomena when an applied external magnetic field is varied or is static.

23. A process in accordance with claim 1, wherein the printed image comprises a magnetically secure document selected from the group consisting of bank checks, negotiable security instruments, glyph encrypted documents, paper currency, postage stamps, postal marks, credit cards, and identification badges.

* * * * *